(12) United States Patent
Gomez (10) Patent No.: US 10,443,109 B2
(45) Date of Patent: *Oct. 15, 2019

(54) METHOD FOR PRODUCING A HOT-FORMED AND QUENCH-HARDENED MOTOR VEHICLE COMPONENT FORMED BY INTERNAL HIGH-PRESSURE FORMING

(71) Applicant: BENTELER Automobiltechnik GmbH, Paderborn (DE)

(72) Inventor: Rafael Garcia Gomez, Koblenz (DE)

(73) Assignee: BENTLER AUTOMOBILTECHNIK GMBH, Paderborn (DE)

( * ) Notice: Subject to any disclaimer, the term of this patent is extended or adjusted under 35 U.S.C. 154(b) by 722 days.

This patent is subject to a terminal disclaimer.

(21) Appl. No.: 15/059,556

(22) Filed: Mar. 3, 2016

(65) Prior Publication Data

US 2016/0258035 A1 Sep. 8, 2016

(30) Foreign Application Priority Data

Mar. 6, 2015 (DE) ...................... 10 2015 103 307

(51) Int. Cl.
*C21D 9/08* (2006.01)
*C21D 8/10* (2006.01)
(Continued)

(52) U.S. Cl.
CPC ............ *C21D 9/08* (2013.01); *B21D 26/033* (2013.01); *B21D 53/88* (2013.01); *B23K 26/262* (2015.10); *B23K 31/027* (2013.01); *C21D 1/18* (2013.01); *C21D 1/56* (2013.01); *C21D 8/105* (2013.01); *B23K 2101/006* (2018.08); *B23K 2101/045* (2018.08); *B23K 2101/18* (2018.08); *B23K 2103/04* (2018.08)

(58) Field of Classification Search
CPC .................................. C21D 9/08; C21D 8/105
USPC .......................................................... 148/570
See application file for complete search history.

(56) References Cited

U.S. PATENT DOCUMENTS

| | | | | |
|---|---|---|---|---|
| 9,248,490 B2 * | 2/2016 | Diersmann | .......... | B21D 26/033 |
| 2013/0020834 A1 * | 1/2013 | Diersmann | .......... | B21D 26/033 |
| | | | | 296/193.06 |

FOREIGN PATENT DOCUMENTS

| | | |
|---|---|---|
| DE | 102004007071 | 9/2005 |
| DE | 102011051965 | 1/2013 |

(Continued)

*Primary Examiner* — Weiping Zhu
(74) *Attorney, Agent, or Firm* — Jacobson Holman, PLLC.

(57) ABSTRACT

The present invention relates to a method for producing a hot-formed and quench-hardened tubular motor vehicle component (7) by way of internal high-pressure forming, a metallic starting material being at least partially heated to a heating temperature, in particular to a temperature above Ac3, being subjected to internal high-pressure forming in the hot state, and subsequently being quenched, preferably quench-hardened, wherein the internal high-pressure forming is performed as high-speed forming in a time of between 1 and 30 seconds, and the still-hot, formed motor vehicle component (7) is transferred into at least one separate quenching tool (5, 10) and is in particular quench-hardened, the motor vehicle component (7) being braced in a fixed position in the quenching tool (5, 10) and the cycle time of the quenching tool (5, 10) corresponding to the cycle time of the internal high-pressure forming.

17 Claims, 6 Drawing Sheets

(51) Int. Cl.
*C21D 1/18* (2006.01)
*C21D 1/56* (2006.01)
*B23K 31/02* (2006.01)
*B23K 26/262* (2014.01)
*B21D 26/033* (2011.01)
*B21D 53/88* (2006.01)
*B23K 101/00* (2006.01)
*B23K 101/04* (2006.01)
*B23K 101/18* (2006.01)
*B23K 103/04* (2006.01)

(56) References Cited

FOREIGN PATENT DOCUMENTS

| | | |
|---|---|---|
| DE | 102014002803 | 8/2015 |
| EP | 1704936 | 9/2006 |

\* cited by examiner

Fig. 6d ent is transferred into at least one separate quenching tool and is in particular quench-
METHOD FOR PRODUCING A HOT-FORMED AND QUENCH-HARDENED MOTOR VEHICLE COMPONENT FORMED BY INTERNAL HIGH-PRESSURE FORMING The present invention relates to a method for producing a hot-formed and quench-hardened motor vehicle component.

The present invention also relates to a method for producing a hollow elongate shaped component.

Furthermore the present Invention relates to a motor vehicle pillar.

BACKGROUND OF THE INVENTION

It is known from the prior art for components to be produced from hardenable steel alloys by way of hot forming and quench hardening. For this purpose, firstly, a starting material is heated to a temperature above Ac3, which is aiso referred to as austenization of the steel. The component is formed in the hot state, and is hardened in a subsequent quenching process. This means that a quenching rate is realized which is such that the initially austenitic microstructure is transformed into a partially, in particular completely, martensitic microstructure, which exhibits high hardness and strength.

Furthermore, it is known from the prior art for components to be formed three-dimensionally by way of internal high-pressure forming. For this purpose, an action medium is introduced into a preferably tubular component with such a high pressure that said component is deformed radially outward from the inside.

Furthermore, DE 10 2011 051 985 A1 has disclosed a method in which the internal high-pressure forming is performed in conjunction with hot forming and quench hardening.

BRIEF SUMMARY OF THE INVENTION

It is an object of the present invention, proceeding from the prior art, to specify a method for internal high-pressure forming with which it is possible to produce components, formed by internal high-pressure forming, which exhibit high strength characteristics and high geometric precision in a short production time.

The above-stated object is achieved according to the invention by way of a method for producing a hot-formed and quench-hardened motor vehicle component by way of internal high-pressure forming.

The above-stated object is furthermore achieved according to the invention by way of a method for producing a hollow elongate formed component.

The above-stated object is furthermore achieved by way of a motor vehicle pillar.

The method for producing a hot-formed and quench-hardened tubular motor vehicle component by way of internal high-pressure forming, a metallic starting material, in particular composed of a hardenable steel alloy, being at least partially heated to a heating temperature, in particular to a temperature above Ac3, being subjected to internal high-pressure forming in the hot state, and subsequently being quenched, preferably quench-hardened, is characterized, according to the invention, in that the internal high-pressure forming is performed as high-speed forming in a time of between 1 and 30 seconds, and, after the completion of the internal high-pressure forming process, the still-hot, formed motor vehicle component is transferred into at least one separate quenching tool and is in particular quench-hardened, the component being braced in a fixed position in the quenching tool and the cycle time of the quenching tool corresponding to the cycle time of the internal high-pressure forming. The cycle time is preferably from 2.4 to 20 seconds.

In the context of the invention, it is provided in particular that the quench hardening is performed in two successive quenching stages, wherein each quenching stage is performed in a separate quenching tool. It is particularly preferable for three quenching stages or even four quenching stages to be performed in succession, such that the three or four quenching stages are performed in three or four quenching tools positioned in series. Here, the cycle time of each quenching stage corresponds in each case to the cycle time of the internal high-pressure forming itself. A further preferred design variant with two quenching stages provides that a first quenching stage is performed by the internal high-pressure forming itself. In a second, subsequent quenching stage in a separate quenching tool, internal cooling and external cooling are then performed. In particular, the internal cooling is performed by way of a medium flow with a high throughflow rate.

The advantage essential to the invention is that the internal high-pressure forming can itself be performed extremely quickly in a particularly short cycle time. Said internal high-pressure forming is particularly preferably performed in a time of 2 to 20 seconds, in particular of 2.4 to 20 seconds, particularly preferably of 2 to 15 seconds. Subsequently, the motor vehicle component thus produced by internal high-pressure forming, said motor vehicle component preferably still being at least partially at a temperature above Ac3 after the internal high-pressure forming itself, is removed and transferred into the subsequent quenching fool, and is quenched therein. In the case of two quenching stages, a first cooling process is performed in the first quenching tool and, after the completion of the first cooling process, the component is transferred info a second quenching tool and subjected to a second quenching stage. Here, it is preferable for least the first quenching stage itself to have the same cycle time or a shorter cycle time than that of the internal high-pressure forming. It is preferable for an interlinked system to be used in which all of the working stations have the same cycle time.

The dimensional accuracy is achieved in particular by virtue of the fact that, in the quenching tools, the component is braced in a fixed position. Distortion that occurs during the quench hardening is compensated by way of the fixing in position, such that the component has the desired dimensional accuracy and geometric dimensions after the quench hardening process. In particular, it is thus possible for the components to be produced with high dimensional accuracy in a particularly short cycle time. This is realized in particular by way of the decoupling of the processes of hot forming and quench hardening to two separate tools. If high cooling rates are required in the case of large wall thicknesses of the component to be deformed, it is in turn possible for said high cooling rates to be realized by way of two, three or four successive quenching stages, without the required time of the overall quench hardening process having an adverse effect on the particularly short time of the internal high-pressure forming.

The quenching itself may be performed in a dip bath and/or in a flow basin, alternatively also with spray cooling and/or injection cooling. In all cases, it is vital in particular that the fixing in position is realized by way of punctiform or linear contact, such that, in each case, an extremely large component surface of the produced motor vehicle component comes into contact with the cooling medium, and a high cooling rate is realized in this way. It is also additionally possible for an internal flow to be used in the dip bath. In particular, this is dependent on the wall thickness of the component to be cooled. In particular, in the dip bath, a flow is generated which improves the cooling, such that a greater temperature can be cooled in less time. In particular, an internal flow is generated at the tubular component. It is however also alternatively or additionally possible for an external flow to be generated which flows over the outside of the component.

For this purpose, a holding device is provided which is formed for example by clamping jaws or by holding clamps. When the holding device is closed, a geometric dimension for the motor vehicle component to be quenched is realized.

The component undergoes shrinkage and/or distortion already upon initial contact with the quenching medium. In this regard, it is provided according to the invention that the geometric dimension of the closed holding device has an undersize in relation to the component dimension before the start of the quenching process. In this way, it is ensured according to the invention that punctiform, linear and/or ring-shaped contact is basically realized between the holding device and outer shell surface of the motor vehicle component to be quenched, despite shrinkage.

In a further particularly preferred design variant, the means for fixing in position is in the form of readjustable clamping jaws. The clamping jaws are then readjusted during the quenching process in accordance with the shrinkage and/or the desired component geometry of the motor vehicle component to be produced. The dimensional accuracy of the motor vehicle component produced is ensured in a particularly effective manner by way of this measure. The clamping jaws may for example be driven and/or adjusted electrically and/or electromechanically, or in particular also piezoelectrically or electromagnetically. It is also conceivable for the clamping jaw to be driven and/or adjusted relative to the component by way of a servomotor.

In this regard, it is particularly expedient according to the invention for an expected shrinkage curve of the motor vehicle component during the quench hardening to be calculated and/or determined experimentally, and for the clamping jaws to be readjusted in a manner dependent on the shrinkage curve. In the context of the invention, a shrinkage curve is to be understood not to mean a curve in the geometrical sense but the extent or the degree to which the component shrinks in itself, consequently in particular in a radial direction and in a longitudinal direction.

It is furthermore particularly preferable for spray cooling to be realized by way of nozzles, wherein rotating and/or pulsed spraying is performed by way of the nozzles, such that the component is cooled homogeneously. By contrast to cooling using a fixed jet, a situation is thus avoided in which specific regions are initially completely cooled such that the cooling then propagates further in the component itself by heat conduction, it rather basically being the case that large parts of the surface are cooled with the same cooling rate. Here, in particular, use is made of a pre-cooling medium. This may for example be an air/liquid mixture or a gas, for example nitrogen.

It is furthermore particularly preferable for a segmented internal high-pressure forming tool to be used for the hot forming. The individual segments of the forming tool can then be displaced yet further during the hot-forming process, such that not only a radial expansion but also a radially inward movement, or other shaping measures with regard to the external contour and the wall thickness, can be performed owing to the segmented configuration.

In particular, in the context of the invention, it is also possible for shaft bodies, for example camshafts, to be produced, wherein the shaft bodies in particular have no external flange. Furthermore, using a segmented internal high-pressure forming tool, it is possible to generate material accumulations on the motor vehicle component.

It is however particularly preferable for the method according to the invention to be used to produce motor vehicle components for a motor vehicle body, which motor vehicle components are in particular motor vehicle structural components and motor vehicle external skin components. The method according to the invention is particularly preferably used to produce motor vehicle pillars, that is to say elongate hollow motor vehicle components.

The segmented internal high-pressure forming tool is in particular divided into individual segments in a longitudinal direction of the closed infernal high-pressure forming tool, which segments have a spacing to one another in the initial state. During the internal high-pressure forming process, the segments are then in particular fed, from both sides, by a pressure force which moves said segments toward one another, such that material accumulations are formed on the component.

Furthermore, the method is particularly preferably performed on a temperature-controlled internal high-pressure forming tool, such that, during the internal high-pressure forming process, the component itself does not cool down to too great an extent and, after the completion of the internal high-pressure forming process, is at a temperature of at least Ar1. Said component is particularly preferably at a temperature of between Ar1 and Ar3, and in particular of at least Ar3, after the completion of the internal high-pressure forming process, and is particularly preferably even at a temperature higher than Ar3 depending on the required component characteristics. The component is then transferred, in such a hot state, into the at least first quench hardening tool. In particular, complete quench hardening by microstructure transformation is effected in the quenching tool. Here, the austenite is transformed into martensite and/or into bainite, preferably also into a mixed microstructure composed of martensite and bainite.

The above-stated object is additionally or alternatively achieved by way of a method for producing a hollow elongate shaped component from a steel material, in particular for producing a motor vehicle pillar, characterized by the following method steps:
  providing two sheet-metal blanks, composed in particular of a pre-coated, hardenable steel alloy,
  pre-bending at least one sheet-metal blank at a longitudinal edge such that in each case one longitudinal edge of one sheet metal blank is placed in butting contact with the longitudinal edge of the second sheet-metal blank, and an at least partially open hollow profile is provided, in particular a closed hollow profile,
  thermally joining the longitudinal edges that are in butting contact with one another, in particular by longitudinal seam welding,
  performing internal high-pressure forming of the hollow profile.

In particular, by way of the pre-shaping or pre-bending and the joining, described below, to form an at least partially open profile, a preform can be created which exhibits non-critical degrees of deformation, such that specifically no cracking or spelling of the pre-coating occurs. In all, it is thus possible for a hollow profile blank to be generated which exhibits adequate pre-shaping, wherein damage owing to excessively high degrees of deformation and/or damage to the pre-coating is prevented.

With this method, it is possible to produce a component with high degrees of deformation, but without damaging a pre-coating or the material microstructure during the production process. Firstly, pre-bending or pre-shaping is carried out on at least one of the two planar sheet-metal blanks, preferably on both planar sheet-metal blanks. In the simplest configuration, this may be a folding process, though may also include more complex pre-shaping or multiple folds of each sheet-metal blank. The pre-shaped or pre-bent sheet-metal blanks are then placed into butting contact by way of in each case one longitudinal edge. This means that the respective face side of the longitudinal edges of one sheet-metal blank bears against the face side of the longitudinal edge of the second sheet-metal blank. The contact is then preferably realized over the full area along the entire longitudinal edge.

In a subsequent method step, thermal joining, in particular longitudinal seam welding, is performed at the longitudinal edges that bear against one another. In this way, a hollow profile or hollow profile blank is generated which is partially open, preferably C-shaped, but preferably has a closed cross section. Said hollow profile is then placed into an internal high-pressure forming tool and subjected to infernal high-pressure forming.

The method is preferably carried out such that, firstly, before the internal high-pressure forming but after the thermal joining, a heat treatment, in particular heating, is performed, preferably to a temperature higher than Ac3. Disadvantageous material microstructure impairment that may have arisen in the zone of heat influence of the weld seam is hereby homogenized. In the case of pre-coated materials being used, the coating is fully alloyed. The then hot hollow profile, which is in particular at a temperature higher than Ac3, is subjected to internal high-pressure forming in the hot state, in particular in the austenitic state, whereby at the same time, owing to the hot forming, the degrees of freedom in terms of shaping are also increased.

Subsequently, a quenching process, in particular a quench hardening process, is performed, with the formation of an at least partially, in particular completely, martensitic microstructure. For the internal high-pressure forming and the quench hardening, it is possible in particular for the method steps already described above to even be implemented further to form prescribed method steps.

It is furthermore preferable for the hollow profile to initially be created such that, at those longitudinal edges of the sheet-metal profiles which are situated opposite the longitudinally seam-welded longitudinal edges, in each case one flange is realized by forming, and the two flanges are then placed in form-fitting contact, in particular in overlapping contact. This may be performed either in preparatory fashion already in the case of the hollow profile, or else during the placing-in and closing of the internal high-pressure forming tool. During the internal high-pressure forming itself, an enlargement of the cross section then takes place at least in sections, with a reduction or shortening of at least one flange, preferably of both flanges. Alternatively or in addition, ironing of the material may also occur owing to the internal high-pressure forming, leading to a reduction in wall thickness. In particular, if the flanges are clamped in the internal high-pressure forming tool, the flanges may be clamped in the manner of a hold-down means, and by way of targeted readjustment of the flanges, the ironing action can be controlled during the internal high-pressure forming.

This means that there is a follow-up flow of flange material into the interior space of the internal high-pressure forming tool, said flange material providing the material required for the enlargement of the cross section.

In particular, it is thus possible to produce a component formed by internal high-pressure forming, which component is in one piece but was initially of two-shell form. This is suitable in particular for the production of motor vehicle pillars, but also for example for the reduction of an instrument cluster support or of the exhaust-gas components or other tubular motor vehicle body components.

A further constituent part of the present invention is a motor vehicle pillar which is formed from a closed hollow profile. Here, the hollow profile has a cross section which varies over the course of the motor vehicle pillar, hereinafter referred to as longitudinal extent. The variation of the cross section may relate both to the geometrical shape of the cross section and to the size of the cross section. The motor vehicle pillar itself is produced by hot forming and at least partial press hardening, in particular in accordance with one of the above-described methods. Furthermore, the motor vehicle pillar has an anti-corrosion coating, in particular a coating which is alloyed all the way through with the steel base material owing to the hot forming. According to the invention, the motor vehicle pillar is characterized in that the hollow profile is formed from two sheet-metal blanks which are connected by way of a longitudinal weld seam which runs so as to be oriented in the direction of longitudinal extent, with two flanges, which protrude in an outwardly oriented direction and which at least partially overlap, being formed in the region of that side of the hollow profile which is situated opposite the longitudinal weld seam. Consequently, each longitudinal side of a sheet-metal blank is formed, on one side, by the longitudinal weld seam and, on the other side, by the flange. It is also possible for the two flanges to likewise be coupled to one another by way of a longitudinal weld seam on the flange side.

The tensile strength of the motor vehicle pillar is particularly preferably at least regionally greater than 1350 MPa. In the context of the invention, tensile strengths of up to 2100 MPa can be realized.

The coating itself particularly preferably has the alloy elements aluminum, iron and silicon. It is an intermetallic coating with an anti-corrosion action. The coating is formed, during the austenization of the sheet-metal blanks which is required for the hardening process, from an aluminum-silicon pre-coating by diffusion processes with the iron of the steel material, and preferably has a thickness of between 10 and 50 micrometers.

The motor vehicle pillar according to the invention furthermore particularly preferably has, in an installed position, a door frame section which runs a substantially vertical orientation and a window frame section which is arranged obliquely with respect thereto, preferably at an angle of 10° to 80°, in particular between 30° and 80°. If is consequently possible to produce an altogether curved profile or angled profile, and at the same time cross sections which differ from one another over the entire profile. The component can thus be produced inexpensively with high complex degrees of freedom in terms of shaping, specifically for high-strength and ultra-high-strength steel materials, in particular with a coating. By way of the austenization performed before the hot forming, it is simultaneously the case that the longitudinal weld seam, and in this case in particular the material microstructure that may under some circumstances be adversely affected in the zone of heat influence, are homogenized, such that a high strength or ultra-high-strength microstructure is realized even in the region of the longitudinal weld seam, and in particular in the region of the zone of heat influence. The motor vehicle pillar thus produced thus exhibits the predefined strengths and thus satisfies the associated crash requirements.

BRIEF DESCRIPTION OF THE SEVERAL VIEWS OF THE DRAWINGS

Further advantages, features, characteristics and aspects of the present invention will be discussed in the following description. Preferred design variants are illustrated in the schematic figures. The FIGS. serve for easier understanding of the invention. In the figures:

FIGS. 4 and 5 show a section line as per IV-IV and V-V from FIG. 3, and FIGS. 6a) to d) show a process route for producing a unipartite, two-shell component formed by internal high-pressure forming.

DETAILED DESCRIPTION OF THE INVENTION

Figure 1:
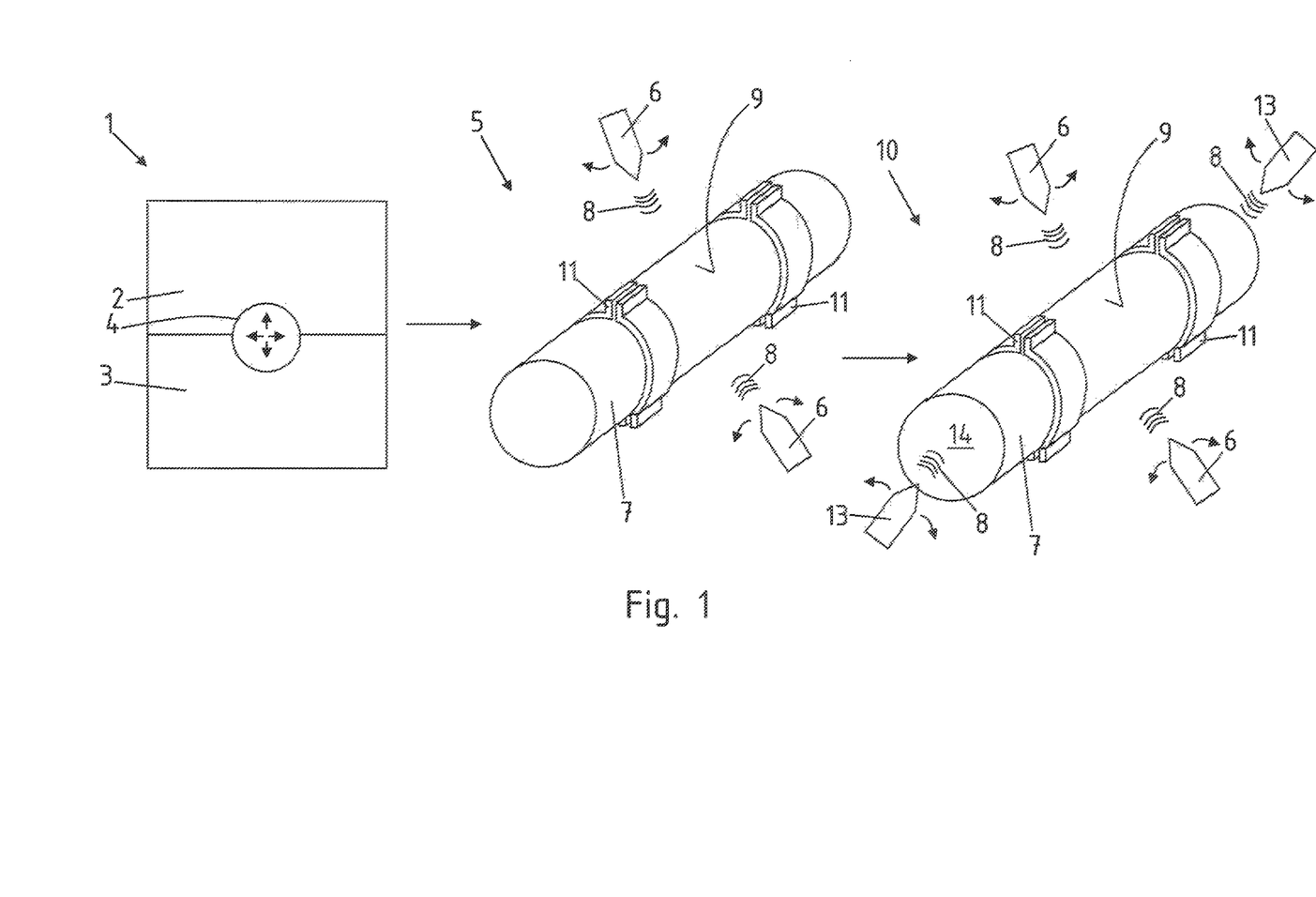
FIG. 1 schematically shows a process sequence of an internal high-pressure forming process according to the invention with two quench hardening tools positioned in series.

FIG. 1 firstly illustrates an internal high-pressure forming tool 1, having an upper tool 2 and a lower tool 3, into which there is placed an elongate tubular body 4 which, in a prior heating process (not illustrated in any more detail), has been at least partially heated to above Ac3. After the completion of the internal high-pressure forming process, said tubular body is transferred into a first quenching tool 5, wherein the first quenching tool 5 has nozzles 6 which subject the produced motor vehicle component 7 to rotating and/or pulsed jets 8 of a quenching medium. Thus, the surface 9 of the motor vehicle component 7 is quenched approximately constantly, because the same amount of coolant is applied to the surface 9 in each case, by contrast to a fixed jet 8. Furthermore, nozzles 13 are illustrated, which, here, in the case of the second quenching tool 10, perform injection cooling in an interior space 14 of the produced motor vehicle component 7.

After the completion of the first quenching process in the first quenching tool 5, the intermediately cooled motor vehicle component 7 is transferred into a second quenching tool 10 and subjected to a second quenching process. In this case, too, nozzles 6 are in turn provided which subject the surface 9 to correspondingly pulsating and/or rotating jets 8 and, in so doing, cool the motor vehicle component 7. Furthermore, in the first and second quenching tools 5, 10, there are provided clamping jaws 11 by means of which the motor vehicle component 7 is braced in its intended geometry during the quench hardening process. Distortion as a result of shrinkage and/or stresses can thereby be compensated or prevented, whereby the dimensional accuracy of the quenched motor vehicle component 7 is ensured.

Figure 2:
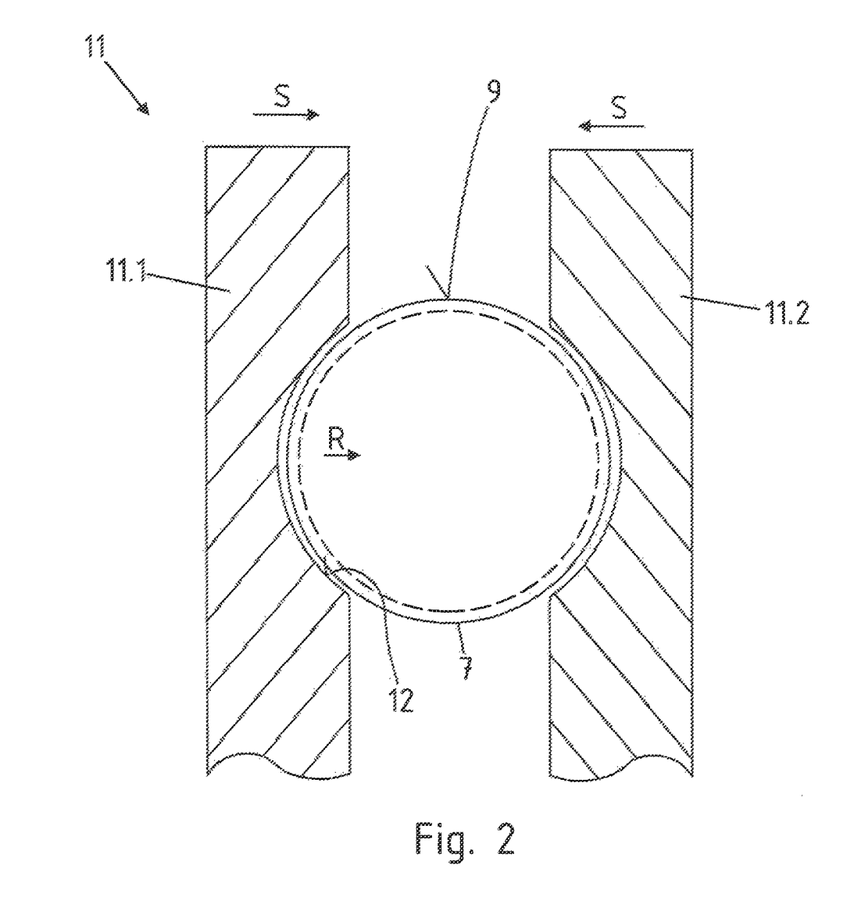
FIG. 2 shows a cross section through a clamping jaw with clamped motor vehicle component.

FIG. 2 shows a cross section through a clamping jaw 11 with two clamping jaw parts 11.1, 11.2 with a braced motor vehicle component 7, wherein the motor vehicle component 7 undergoes shrinkage during the quench hardening process, illustrated here in an inward direction in relation to the radial direction R (by way of a dashed line). For this purpose, clamping jaws 11 can perform a pivoting movement S inward, and can thus be readjusted in accordance with the shrinkage. If is thus ensured in each case that a bracing surface 12 of the clamping jaws 11 is in contact with the surface 9 of the motor vehicle component 7 that is produced. Undesired distortion as a result of shrinkage and/or stresses is thus substantially prevented. For this purpose, the clamping jaws 11 are preferably designed to be cool, or actively cooled, for example by way of cooling lines.

Figure 3:
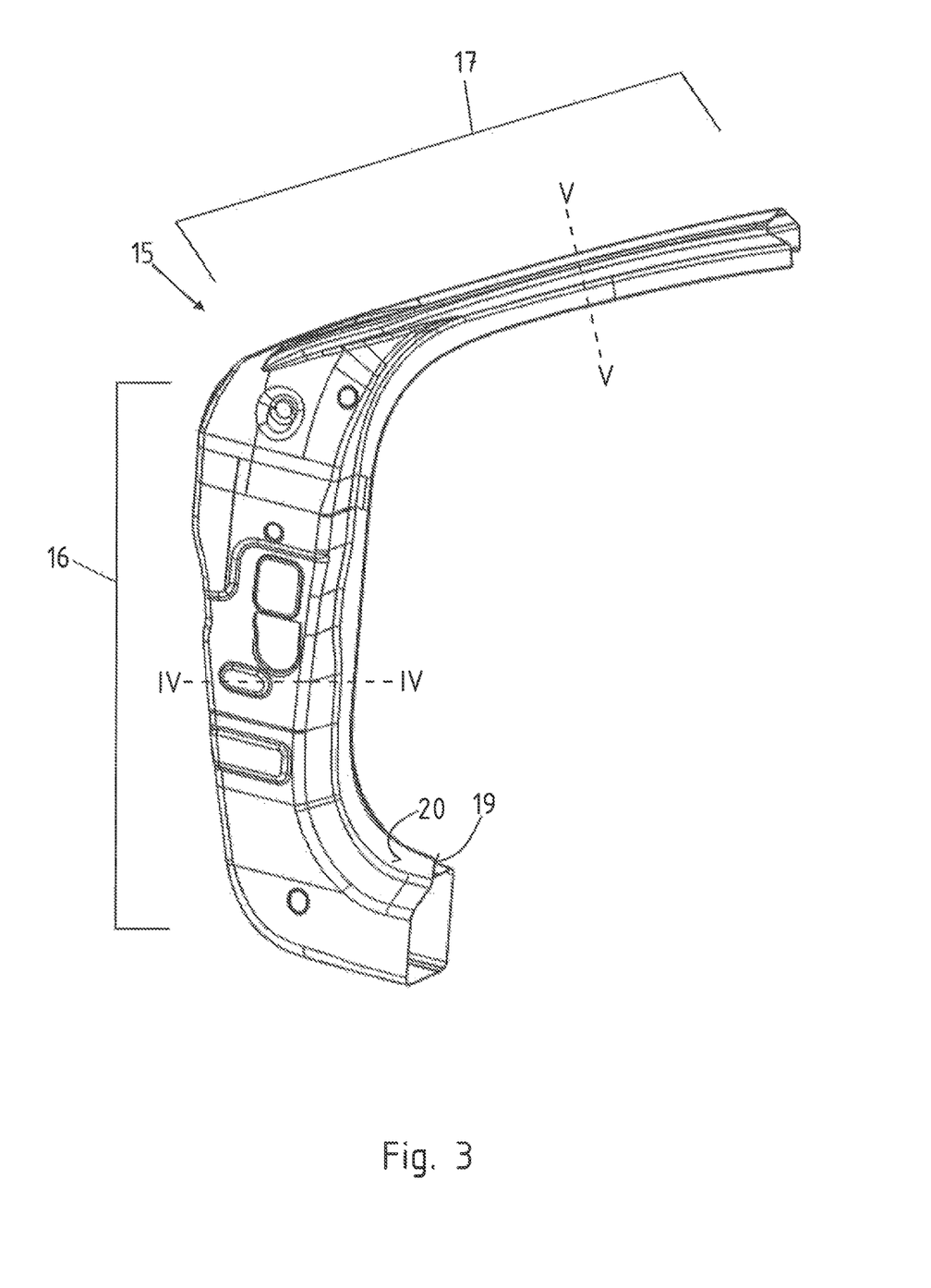
FIG. 3 shows a motor vehicle pillar produced using the method according to the invention in a perspective view.
Figure 4:
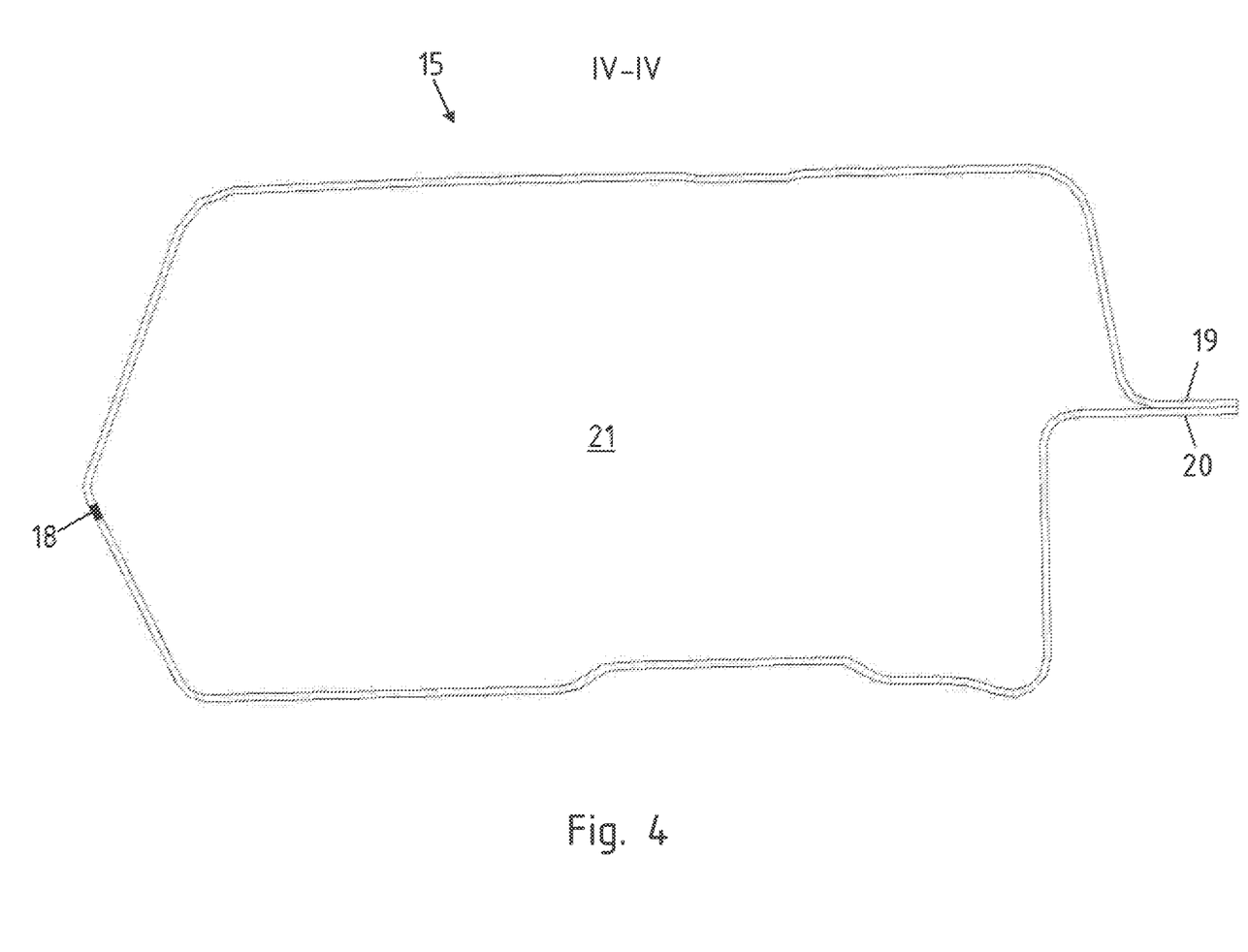
Figure 5:
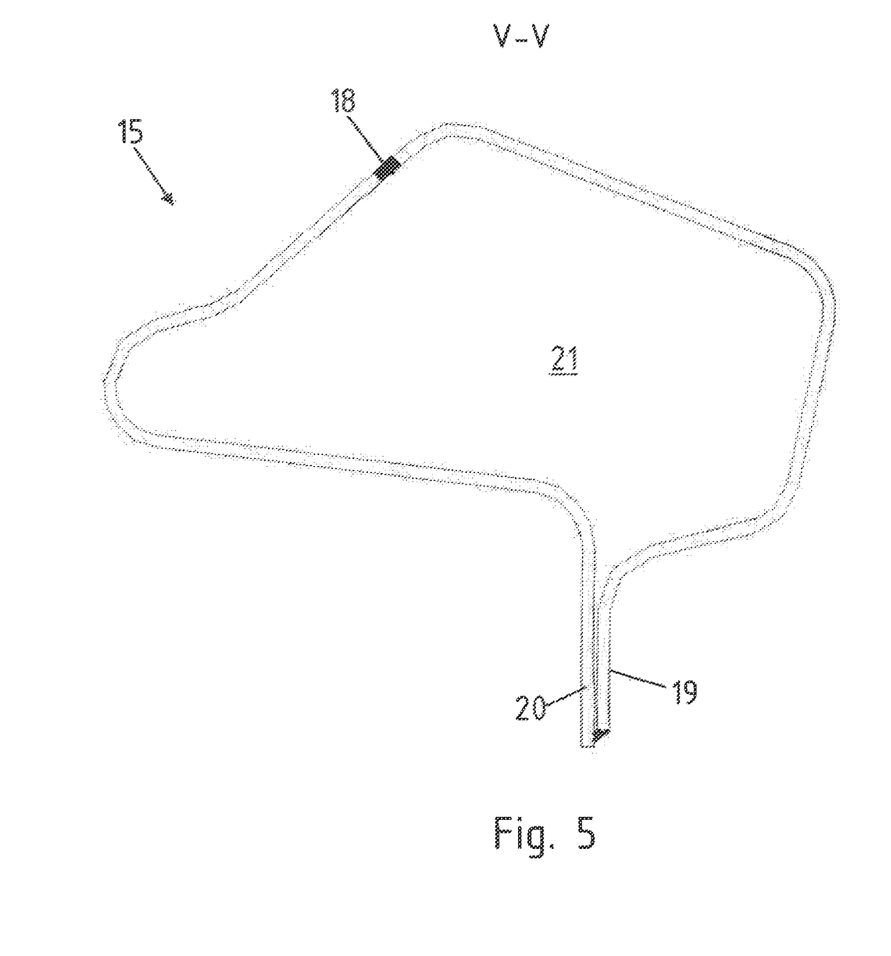
Figure 6A:
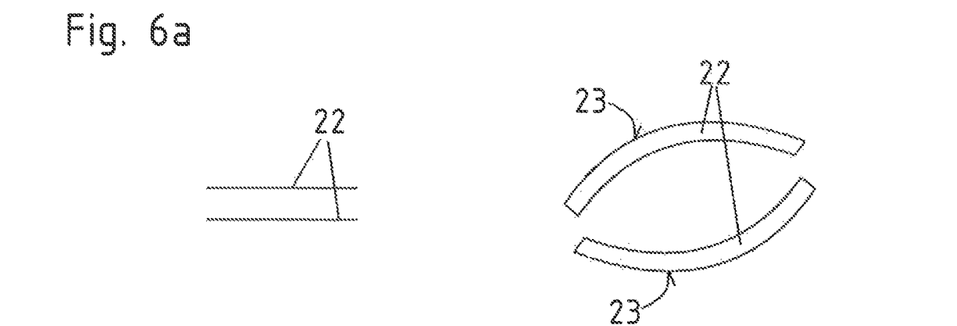
Figure 6B:
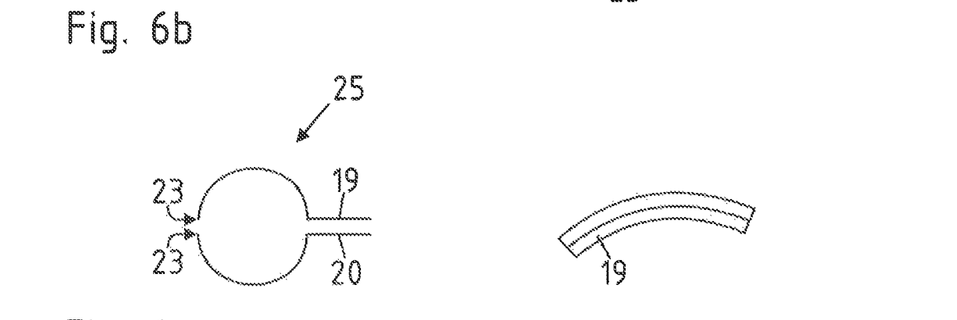
Figure 6C:
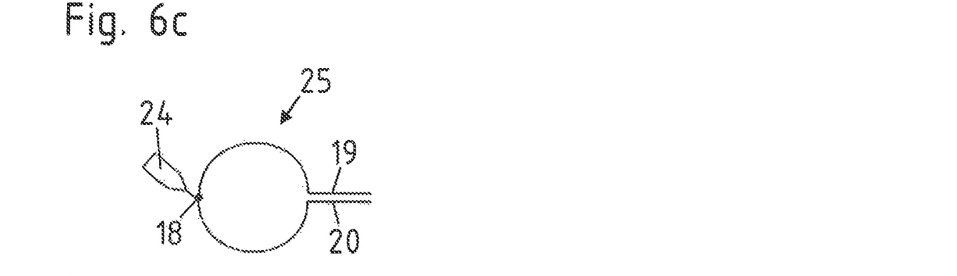
Figure 6D:
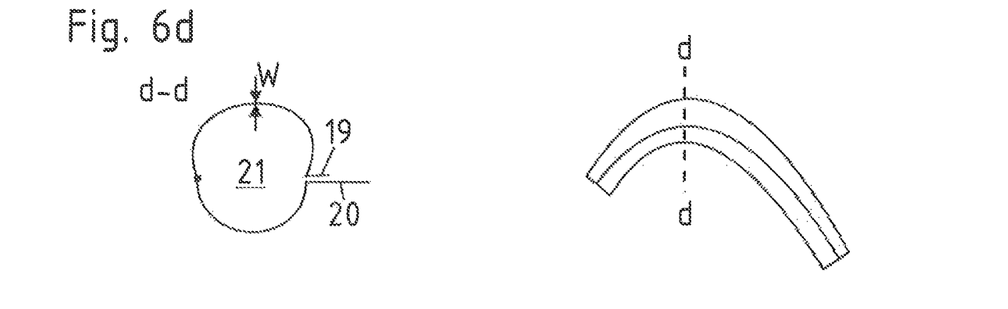

FIG. 3 furthermore shows a motor vehicle pillar 15 produced by way of the method according to the invention, in particular in the form of an A pillar. The A pillar in this case has a lower door frame section 18 and an upper window frame section 17. In FIGS. 4 and 5, it is possible to clearly see that the respective sections 16, 17 have mutually different cross-sectional profiles and also mutually different cross-sectional sizes. This is realized by way of the internal high-pressure forming process. For this purpose, firstly, two sheet-metal shells are pre-formed and placed in butting contact with one another by way of two opposite face sides, such that a longitudinal weld seam 18 is realized. The opposite free sides form in each case a first flange 19 and a second flange 20, wherein the flanges 19, 20 protrude outward in relation to an interior space 21. The pre-shaped sheet-metal blanks may in this case already have an outer contour which is such that the door frame section 18 and the window frame section 17 are realized, wherein, however, the respective longitudinal edges come into contact, in particular in fully form-fitting fashion, by way of their face sides to form the longitudinal weld seam 18. The thus longitudinally seam-welded component with the protruding flanges 19, 20 is then placed into an internal high-pressure forming tool 1, and the mutually different cross sections and cross-sectional sizes, illustrated in particular in FIGS. 4 and 5, are realized by way of the internal high-pressure forming process. The hollow profile has preferably initially been austenized and then subjected to internal high-pressure forming in the austenitic state.

FIG. 6 shows a method sequence for the production of a formed component produced from a unipartste and two-shell motor vehicle pillar 15. For this purpose, firstly, two sheet-metal blanks 22 are provided which, as per the plan view of FIG. 6a), each have a curvature. The sheet-metal blanks 22 are then pre-formed such that the face sides of the longitudinal edges 23 of each sheet-metal blank 22 come into form-fitting butting contact, as illustrated in FIG. 6b) in a cross-sectional view. The remaining gap serves for clearer illustration. On the side situated opposite the longitudinal sides that are in each case in butting contact with one another, the first flange 19 and the second flange 20 are then formed, which is clearly illustrated in particular once again in the plan view in FIG. 6b) in the form of a hollow profile 25. Here, in particular, it is possible to see the first flange 19 in a plan view. The sheet-metal blanks 22 have been pre-formed so as to each have a semicircle. As per FIG. 6c), a longitudinal weld seam 18 is produced on the hollow profile 25 by way of a welding torch 24 or a laser, after which austenization, and internal high-pressure forming, are then preferably performed. By way of the internal high-pressure forming, the inferior space 21, illustrated in FIG. 6, is formed by virtue of the first flange 19 being shortened in the direction toward the interior space 21, and permitting the radial expansion by way of a follow-up flow of material. This is also illustrated once again in the plan view, in which the first flange 19 is of smaller form in the region of the section line than toward the respective end sides. In the context of the invention, the internal high-pressure forming method may however also result in ironing of the material with a reduction of the wall thickness W, such that the radially expanding material is provided not only by way of a follow-up flow and thus a shortening of the flange but also by way of ironing of the material with a reduction of the wall thickness W.

It is also possible for the flanges 19 and 20 to also be welded, preferably likewise by way of a longitudinal weld seam 18.

LIST OF REFERENCE DESIGNATIONS

1—Internal high-pressure tool
2—Upper tool
3—Lower tool
4—Tubular body
5—First quenching tool
6—Nozzle
7—Motor vehicle component
8—Jet
9—Surface
10—Second quenching tool
11—Clamping jaw
11.1—Clamping Jaw part
11.2—Clamping jaw part
12—Bracing surface
13—Nozzle
14—Interior space of 7
15—Motor vehicle pillar
16—Doorframe section of 15
17—Window frame section of 15
18—Longitudinal weld seam
19—First flange
20—Second flange
21—Inferior space
22—Sheet-metal blank
23—Longitudinal edge
24—Welding torch
25—Hollow profile
R—Radial direction
S—Pivoting movement
W—Wall thickness

The invention claimed is:

1. A method for producing a hot-formed and quench-hardened tubular motor vehicle pillar by way of internal high-pressure forming, a metallic starting material being at least partially heated to a heating temperature, in particular to a temperature above Ac3, being subjected to internal high-pressure forming in the hot state, and subsequently being quench-hardened, wherein the internal high-pressure forming is performed as high-speed forming during a time of between 1 and 30 seconds, and the still-hot, formed motor vehicle pillar is transferred into at least one separate quenching tool and is quench-hardened, the motor vehicle pillar being braced in a fixed position in the quenching tool and the cycle time of the quenching tool corresponding to the cycle time of the internal high-pressure forming, the method further comprising the following steps,
providing two sheet-metal blanks, composed in particular of a pre-coated, hardenable steel alloy,
pre-bending at least one sheet-metal blank at a longitudinal edge such that in each case one longitudinal edge of one sheet metal blank is placed in butting contact with the longitudinal edge of the second sheet-metal blank, and a closed hollow profile is provided,
thermally joining the longitudinal edges that are in butting contact with one another, in particular by longitudinal seam welding, and
performing internal high-pressure forming of the hollow profile.

2. The method as claimed in claim 1, wherein the motor vehicle pillar is quenched in two successive stages, and for this purpose, is transferred initially into a first quenching tool and subsequently into a second quenching tool, each quenching tool operating with the cycle time of the internal high-pressure forming.

3. The method as claimed in claim 1, wherein the internal high-pressure forming is performed during a time of between 2 and 15 seconds.

4. The method as claimed in claim 1, wherein the quenching is performed in a dip bath, and/or wherein the quenching is performed by way of spray cooling and/or injection cooling.

5. The method as claimed in claim 1, wherein a positive fixing in position in each quenching tool is performed by way of a holding device, the geometric dimension of the holding device having an undersize in relation to the pillar dimension before the quenching process.

6. The method as claimed in claim 1, wherein an internal high-pressure forming tool is cooled and heated, the temperature in the component being set to between martensite start temperature and Ac3.

7. The method as claimed in claim 1, wherein a means for fixing in position is in the form of readjustable clamping jaws, and, during the quenching process, the clamping jaws are readjusted in accordance with the shrinkage of the motor vehicle pillar.

8. The method as claimed in claim 1, wherein nozzles of a spray cooling means and/or injection cooling means perform rotating and/or pulsed spraying, such that the motor vehicle pillar is cooled homogeneously.

9. The method as claimed in claim 1, wherein the motor vehicle pillar is produced.

10. The method as claimed in claim 1, wherein an expected shrinkage curve of the motor vehicle pillar is calculated or determined experimentally, and clamping jaws are readjusted in a manner dependent on the shrinkage curve.

11. The method as claimed in claim 1, wherein linear or punctiform contact against the surface of the produced motor vehicle pillar is generated by way of the clamping jaws.

12. The method as claimed in claim 1, wherein a segmented internal high-pressure forming tool with multiple mold segments is used for the hot-forming process, and mold segments are slidingly feedable in particular in a longitudinal direction of the motor vehicle component.

13. The method as claimed in claim 1, wherein the motor vehicle pillar is temperature-controlled during the internal high-pressure forming such that, after removal from an internal high-pressure forming tool, said motor vehicle pillar has a component temperature which, in the quenching tool, effects complete quench hardening by microstructure transformation.

14. The method as claimed in claim 1, wherein the hollow profile is austenized before the internal high-pressure forming, and the pre-coating is fully alloyed.

15. The method as claimed in claim 14, wherein the internal high-pressure forming is performed in the hot state of the hollow profile, and the component that has been formed by internal high-pressure forming is quench-hardened.

16. The method as claimed in claim 1, wherein, on the side situated opposite the longitudinally seam-welded side, there is formed a flange region; particular, in each case one side of the sheet-metal blank is formed as a flange, which flanges overlap in the flange region.

17. The method as claimed in claim 16, wherein, during the internal high-pressure forming, an enlargement of the cross section at least in sections takes place, with a shortening of at least one flange and/or, by way of ironing of the material, with a reduction in the wall thickness (W).

* * * * *